June 16, 1964

N. CODA ETAL 3,137,808

HERMETICALLY SEALED CAPACITOR

Filed June 8, 1960

INVENTOR.
Nello Coda
BY Powell A. Brown

Ralph Hammar
attorney

United States Patent Office 3,137,808
Patented June 16, 1964

3,137,808
HERMETICALLY SEALED CAPACITOR
Nello Coda, Erie, and Powell A. Brown, Wesleyville, Pa., assignors to Erie Technological Products, Inc., a corporation of Pennsylvania
Filed June 8, 1960, Ser. No. 34,802
10 Claims. (Cl. 317—242)

This invention is a welded case, hermetically sealed capacitor. Glass seals are used for the leads, permitting operation at temperatures up to the softing point of the glass. Provisions are made to accommodate relative movement of the parts during welding.

Figure 1:
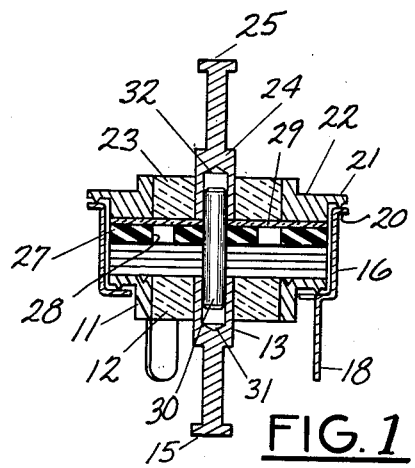
Figure 2:
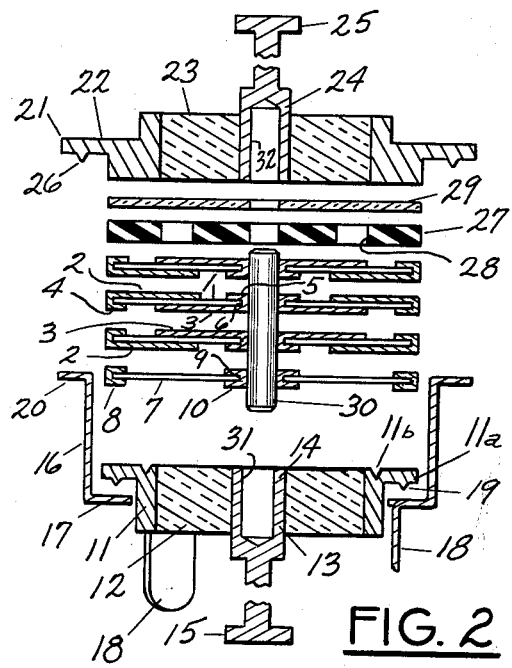
Figure 3:
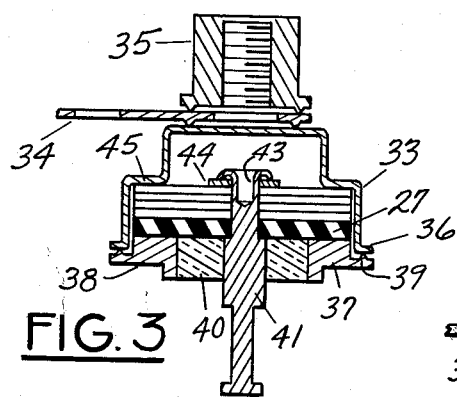
Figure 4:
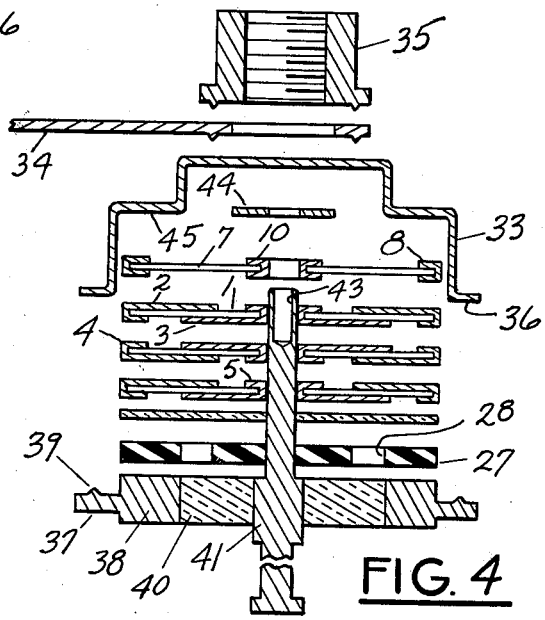
Figure 5:
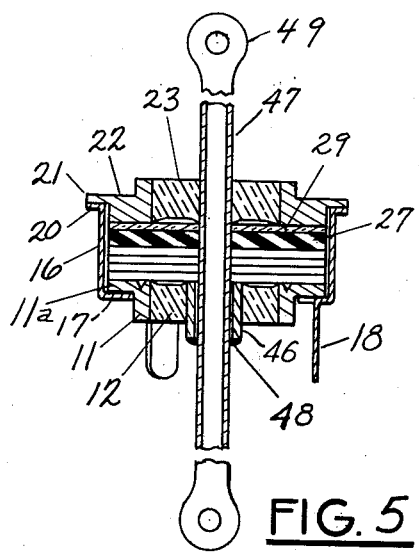

In the drawing, FIG. 1 is a section through a hermetically sealed, feed through capacitor, FIG. 2 is an exploded section, FIG. 3 is a section through a modification, FIG. 4 is an exploded section of the modification, and FIG. 5 is a section through another modification.

The feed through condenser of FIGS. 1 and 2 has a stack of dielectric discs 1 on which are applied electrodes 2 and 3. The electrodes 2 have extensions 4 over the outer edge of the dielectric and the electrodes 3 have extensions 5 over the edge of a central hole 6 in the dielectric. The dielectric discs are stacked so that the electrodes 2 and 3 are connected in parallel when the stack is pressed to bring the respective extensions 4 and 5 into contact with each other. At one end of the stack is a dielectric 7 having at its outer edge a coating 8 overlapping both sides of the dielectric and registering with the sections 4. At the central hole 9 in the dielectric 7 is a similar section 10 overlapping both sides and registering with the sections 5. The metal coating 8 makes contact with an annular terminal 11 sealed at its center to an annular glass to metal seal 12 in turn sealed to a center terminal 13. The inner end 14 of terminal 13 makes contact with the metal coating 10. The outer end 15 of the terminal is a tie point for making external connections to the condenser.

The condenser is enclosed in a shell 16 having a flange 17 extending inwardly beneath the annular terminal 11 and having one or more depending tabs 18. The flange 17 is welded to the terminal 11, the under side of the flange 11a of the terminal being provided with an annular welding projection 19 for this purpose. An annular groove 11b between the flange 11a and the glass seal 12 prevents cracking of the glass due to stresses set up in welding. The weld between the terminal 11 and the flange 17 is preferably made prior to the assembly of the stack of dielectrics into the shell. At the upper end of the shell is an outwardly extending flange 20 registering with a flange 21 on an annular terminal 22, sealed by an annular glass to metal seal 23 to a center terminal 24 of the same shape as the terminal 13, and having an outer end 25 for making external connection to the condenser. On the under side of the flange 21 is an annular welding projection 26 narrower than the flange 20 which is used to weld the flanges 20 and 21 together in a projection welding machine. In the projection welding machine, the flanges 20 and 21 are pressed together and local contact is made between the projection 26 and the flange 20. The electric current flowing through this local contact melts the metal, producing a fusion joint between the projection 26 and flange 20. The pressure is maintained throughout the fusion process in order that the fusion joint may be air tight. This means that the flanges 20 and 21 move toward each other during the welding process and come into substantially direct contact.

At the same time that the projection 26 and flange 20 are welded together to hermetically seal the condenser, the stack of dielectrics within the condenser is placed under compression by a washer 27 of compressible resilient material which will retain its resiliency throughout the range of operating temperatures required of the capacitor. For capacitors haivng an operating range of up to 150° C. and possibly higher, the washer may be made of one of the silicone rubbers. In order to prevent too rapid build-up of pressure as the washer is squeezed, a plurality of holes 28 may be provided. Between the upper side of the washer 27 and the lower side of the terminal 22 is a dielectric pressure plate 29. A similar pressure plate may be arranged between the lower side of the washer 27 and the stack of dielectrics, if desired. During the welding operation, when the flanges 20 and 21 are being pressed together, a pressure is exerted by the terminal 22 through the washer 27 onto the stack of dielectrics compressing the same between the terminals 11 and 22. The resistance offered by the pressure built up in the washer 27 during the welding operation is sufficient to maintain the stack of dielectrics under the desired compression but is insufficient to interfere with the movement of the flanges 20 and 21 toward each other essential for the welding. Without a spring or yielding means arranged between the electrodes 11 and 22, the pressure would be taken directly by the stack of dielectrics and while some compressibility of the stacks is possible, the build up in pressure is so rapid that the stack of dielectrics quickly becomes, in effect, a solid, rigid mass between the terminals 11 and 22 which would limit or prevent the further approach of the flanges 20 and 21 necessary for welding. On the other hand, if additional space is allowed so that the welding operation can be carried out under all conditions, it is possible that the stack will not be under the desired compression. These problems are eliminated by the washer 27 which provides the yielding or spring connection, permitting the relative movement of the flanges 20 and 21, necessary for air tight welding and at the same time preventing too rapid build-up in pressure on the dielectric stack. From one aspect, the holes 28 provide space into which the resilient material of the washer 27 may flow to prevent too rapid build-up of pressure.

The terminals 13 and 24 are connected together by a resilient pin 30, for example, a pin rolled of sheet metal, having opposite ends slidably received in sockets 31 and 32 in the terminals. The sockets are closed at the bottom and have open ends presented toward each other. The inherent resilience of the roll pin maintains the desired electrical contact between the terminals. The roll pin 30 is representative of the class of resilient or spring pin constructions which have the same mechanical and electrical function as the pin 30.

The condenser of FIGS. 1 and 2 is known as a feed through condenser because it may be mounted on a chassis with the terminal 13 projecting from one side of the chassis and the terminal 24 projecting from the opposite side.

In FIGS. 3 and 4 is shown a stand-off capacitor using the same dielectric stack and resilient pressure ring but differing in the terminal construction. In this capacitor, one of the terminals is the shell 33 having welded to its bottom wall a sheet metal terminal 34 and a mounting stud 35. The shell has an outwardly extending flange 36 which is welded to a flange 37 on an annular terminal 38, a narrow annular welding projection 39 being provided for that purpose. A glass to metal seal 40 is provided between the terminal 38 and a center terminal 41 having its outer end 42 available for making circuit connections to the condenser. The inner end of the terminal 41 is in the form of a hollow rivet 43 which is upset over a metal ring 44, riveting the dielectric stack together at the center under the desired pressure. As in the FIGS. 1 and 2 construction, pressure is applied between the flanges 36 and 37 during welding and this pressure is transmitted to the dielectric stack from stepped section 45 on the shell through the outer edge of the stack and the resilient pressure ring 27 to the terminal 38. The pressure ring 27 prevents build-up of pressure in the stack which would interfere with the welding operation in the same manner as in the FIGS. 1 and 2 construction.

In FIG. 5 is shown a feed through capacitor similar to that shown in FIGS. 1 and 2, the primary difference being in the terminals. The terminal at the center of the glass seal 12 is a metal tube 46. The terminal at the center of the glass seal 23 is a smaller diameter metal tube 47 which not only extends away from the glass seal 23 but also projects through the center of the dielectric stack and through the metal tube 46 on the opposite side of the capacitor. The tubes 46 and 47 are soldered together at 48 so that a terminal post for electrical connection is available on opposite sides of the capacitor and the FIG. 5 capacitor is accordingly of the feed through type of FIGS. 1 and 2. The tube 46 provides the through electrical connection of the pin 30. The outer ends of the tube 47 may be flattened and pierced as indicated at 49 to provide connection lugs.

The presence of solder at 48 limits the operating temperature of the capacitor to temperatures safely below the melting point of the solder. The welded joints have no such limitation. In the all welded constructions of FIGS. 1 to 4 inclusive, the limit of operating temperature is determined by other factors such as the melting point of the glass to metal seals, the safe operating temperatures of the dielectric, and the safe operating temperatures of the resilient pressure rings.

What is claimed as new is:

1. A hermetically sealed capacitor comprising a stack of dielectric discs with a center hole, each disc having on one side an outer annular electrode with an extension over the outer edge of the discs onto the opposite side and having on said opposite side an inner annular electrode with an extension extending over the edge of the hole onto said one side, the discs being stacked with the respective extensions in contact with each other to provide one terminal of the capacitor at the center hole of the stack and the other terminal of the capacitor at the periphery of the stack, a hermetically sealed enclosure for the capacitor completely surrounding the stack of dielectric discs and having metal terminal members exerting pressure on the ends of the stack, one of the terminal members comprising an outer annular terminal and a center terminal and an annular glass to metal seal joining the outer terminal to the center terminal, said annular terminal having a flange projecting radially outside said stack, the other of the terminal members having another flange opposite said first flange and hermetically sealed to the balance of the enclosure, one of said flanges having an annular projection presented toward the other of said flanges, said projection being narrower than and making local contact with and fused to the other of said flanges, a resilient ring between one of said terminal members and the adjacent end of the stack, said ring being constructed to yield and limit the pressure on the stack.

2. A hermetically sealed capacitor comprising a stack of dielectric discs with a center hole, each disc having on one side an outer annular electrode with an extension over the outer edge of the discs onto the opposite side and having on said opposite side an inner annular electrode with an extension extending over the edge of the hole onto said one side, the discs being stacked with the respective extensions in contact with each other to provide one terminal of the capacitor at the center hole of the stack and the other terminal of the capacitor at the periphery of the stack, a hermetically sealed enclosure for the capacitor completely surrounding the stack of dielectric discs and having metal terminal members exerting pressure on the ends of the stack, each of the terminal members comprising an outer annular terminal and a center terminal, the outer terminal of one member being connected to said other terminal of the capacitor and the center terminal of one member being connected to said one terminal of the capacitor, one of said annular terminals having a flange projecting radially outside said stack, and the other of said annular terminals having another flange opposite said first flange and hermetically sealed to the balance of the enclosure, one of said flanges having an annular projection presented toward the other of said flanges, said projection being narrower than and making local contact with and fused to the other of said flanges.

3. A hermetically sealed capacitor comprising a stack of dielectric discs with a center hole, each disc having on one side an outer annular electrode with an extension over the outer edge of the discs onto the opposite side and having on said opposite side an inner annular electrode with an extension extending over the edge of the hole onto said one side, the discs being stacked with the respective extensions in contact with each other to provide one terminal of the capacitor at the center hole of the stack and the other terminal of the capacitor at the periphery of the stack, a hermetically sealed enclosure for the capacitor completely surrounding the stack of dielectric discs and having metal terminal members exerting pressure on the ends of the stack, each member comprising an outer annular terminal and a center terminal and an annular glass to metal seal joining the outer terminal to the center terminal, the outer terminal of one of the members being connected to said other terminal of the capacitor and the center terminal of one of the members being connected to said one terminal of the capacitor, said center terminals having sockets closed at the bottom and having open ends presented toward each other, and a pin connector extending through the center hole of the stack and having its ends received in said sockets.

4. A hermetically sealed capacitor comprising a stack of dielectric discs with a center hole, each disc having on one side an outer annular electrode with an extension over the outer edge of the discs onto the opposite side and having on said opposite side an inner annular electrode with an extension extending over the edge of the hole onto said one side, the discs being stacked with the respective extensions in contact with each other to provide one terminal of the capacitor at the center hole of the stack and the other terminal of the capacitor at the periphery of the stack, a hermetically sealed enclosure for the capacitor completely surrounding the stack of dielectric discs and having metal terminal members exerting pressure on the ends of the stack, one of the terminal members comprising an outer annular terminal and a center terminal and an annular glass to metal seal joining the outer terminal to the center terminal, said annular terminal being connected to said other terminal of the capacitor and said center terminal being connected to said one terminal of the capacitor, said annular terminal having a flange projecting radially outside said stack, the other terminal member having another flange opposite said first flange and hermetically sealed to the balance of the enclosure, one of said flanges having an annular projection presented toward the other of said flanges, said projection being narrower than and making local contact with and fused to the other of said flanges, a resilient ring between one of said members and the adjacent end of the stack, said ring being constructed to yield and limit the pressure on the stack, the center terminal of one of the terminal members having a tubular section having one end open and presented to the interior of the enclosure and the other end closed and projecting outside the enclosure, and the center terminal of the other of the terminal members having a connection telescoped within said open end.

5. A hermetically sealed capacitor comprising a stack of dielectric discs with a center hole, each disc having on one side an outer annular electrode with an extension over the outer edge of the discs onto the opposite side and having on said opposite side an inner annular electrode with an extension extending over the edge of the hole onto said one side, the discs being stacked with the respective extensions in contact with each other to provide one terminal of the capacitor at the center hole of the stack and the other terminal of the capacitor at the periphery of the stack, a hermetically sealed enclosure for the capacitor completely surrounding the stack of dielectric discs and having metal terminal members exerting pressure on the ends of the stack, each of the members comprising an outer annular terminal and a center terminal and an annular glass to metal seal joining the outer terminal to the center terminal, the outer terminal of one terminal member being connected to said other terminal of the capacitor and the center terminal of one terminal member being connected to said one terminal of the capacitor, one of said annular terminals having a flange projecting radially outside said stack, and another flange opposite said first flange and hermetically sealed to the balance of the enclosure, one of said flanges having an annular projection presented toward the other of said flanges, said projection being narrower than and making local contact with and fused to the other of said flanges, and the center terminal of the terminal members being tubular and in telescoping relation and connected to each other.

6. A hermetically sealed capacitor comprising a stack of dielectric discs with a center hole, each disc having on one side an outer annular electrode with an extension over the outer edge of the discs onto the opposite side and having on said opposite side an inner annular electrode with an extension extending over the edge of the hole onto said one side, the discs being stacked with the respective extensions in contact with each other to provide one terminal of the capacitor at the center hole of the stack and the other terminal of the capacitor at the periphery of the stack, a hermetically sealed enclosure for the capacitor completely surrounding the stack of dielectric discs and having metal terminal members exerting pressure on the ends of the stack, each of the members comprising an outer annular terminal and a center terminal and an annular glass to metal seal joining the outer terminal to the center terminal, the outer terminal of one terminal member being connected to said other terminal of the capacitor and the center terminal of one member being connected to said one terminal of the capacitor, one of said annular terminals having a flange projecting radially outside said stack, the other of said annular terminals having another flange opposite said first flange and hermetically sealed to the balance of the enclosure, one of said flanges having an annular projection presented toward the other of said flanges, said projection being narrower than and making local contact with and fused to the other of said flanges, the center terminal of one of the members having a socket presented to the interior of the enclosure opposite said hole and the center terminal of the other of the members having a connector telescoped within said socket.

7. A hermetically sealed capacitor comprising a stack of dielectric discs with a center hole, each disc having on one side an outer annular electrode with an extension over the outer edge of the discs onto the opposite side and having on said opposite side an inner annular electrode with an extension extending over the edge of the hole onto said one side, the discs being stacked with the respective extensions in contact with each other to provide one terminal of the capacitor at the center hole of the stack and the other terminal of the capacitor at the periphery of the stack, a hermetically sealed enclosure for the capacitor completely surrounding the stack of dielectric discs and having metal terminal members exerting pressure on the ends of the stack, each of the members comprising an outer annular terminal and a center terminal and an annular glass to metal seal joining the outer terminal to the center terminal, the outer terminal of one terminal member being connected to said other terminal of the capacitor and the center terminal of one member being connected to said one terminal of the capacitor, one of said annular terminals having a flange projecting radially outside said stack, another flange opposite said first flange and hermetically sealed to the balance of the enclosure, one of said flanges having an annular projection presented toward the other of said flanges, said projection being narrower than and making local contact with and fused to the other of said flanges, a resilient ring between one of said members and the adjacent end of the stack, said ring being constructed to yield and limit the pressure on the stack.

8. A hermetically sealed capacitor comprising a stack of dielectric discs with a center hole, each disc having on one side an outer annular electrode with an extension over the outer edge of the discs onto the opposite side and having on said opposite side an inner annular electrode with an extension extending over the edge of the hole onto said one side, the discs being stacked with the respective extensions in contact with each other to provide one terminal of the capacitor at the center hole of the stack and the other terminal of the capacitor at the periphery of the stack, a hermetically sealed enclosure for the capacitor completely surrounding the stack of dielectric discs and having metal terminal members exerting pressure on the ends of the stack, each terminal member comprising an outer annular terminal and a center terminal and an annular glass to metal seal joining the outer terminal to the center terminal, the outer terminal of one terminal member being connected to said other terminal of the capacitor and the center terminal of one terminal member being connected to said one terminal of the capacitor, said center terminals having sockets closed at the bottom and having open ends presented toward each other, a resilient ring between one of said members and the adjacent end of the stack, said ring being constructed to yield and limit the pressure on the stack, and a pin connector extending through the center hole of the stack and having its ends received in said sockets.

9. A hermetically sealed capacitor comprising a stack of dielectric discs with a center hole, the discs having inner electrodes connected to each other at the center hole of the stack and outer electrodes connected to each other at the periphery of the stack, a hermetically sealed enclosure for the capacitor completely surrounding the stack of dielectric discs and having terminal members exerting pressure on the ends of the stack, both of the terminal members comprising an outer annular terminal and a center terminal and an annular glass metal seal joining the outer terminal to the center terminal, said center terminals having a telescoping connection through the center hole of the stack, one of said annular terminals having a flange projecting radially outside said stack, the other of said annular terminals having another flange opposite said first flange and hermetically sealed to the balance of the enclosure and to said first flange, and a resilient ring compressed between one of said terminal members and the stack, said ring being of rubber with numerous perforations providing space into which the rubber can flow to prevent build up of pressure on the stack.

10. A hermetically sealed assembly comprising an electrical component in the form of a stack of dielectric discs having concentric inner and outer terminals on at least one end of the stack, a hermetically sealed enclosure for the component completely surrounding the stack of dielectric discs and having terminal members exerting pressure on the ends of the stack, one of the terminal members comprising an outer annular terminal and a center terminal and an annular glass to metal seal joining the outer terminal to the center terminal, said annular terminal having a flange projecting radially outside of said stack, the other of the terminal members having another flange opposite said first flange and hermetically sealed to the balance of the enclosure and to said first flange, and a resilient ring compressed between one of said terminal members and the stack, said ring being of rubber with numerous perforations providing space into which the rubber can flow to prevent build up of pressure on the stack.

References Cited in the file of this patent

UNITED STATES PATENTS

| | | |
|---|---|---|
| 1,361,328 | Hachmann | Dec. 7, 1920 |
| 1,754,268 | Dubilier | Apr. 15, 1930 |
| 1,821,055 | Dubilier | Sept. 1, 1931 |
| 2,430,433 | Minnium | Nov. 4, 1947 |
| 2,756,375 | Peck | July 24, 1956 |
| 2,962,541 | Snader | Nov. 29, 1960 |
| 3,005,867 | Green et al. | Oct. 24, 1961 |

FOREIGN PATENTS

| | | |
|---|---|---|
| 476,408 | Great Britain | Dec. 8, 1937 |